April 21, 1942.　　　S. W. NICKELLS　　　2,280,345
PNEUMATIC CONTROL
Filed March 13, 1939　　　4 Sheets-Sheet 1

Inventor
Stanley W. Nickells
George H. Fisher
Attorney

April 21, 1942.    S. W. NICKELLS    2,280,345
PNEUMATIC CONTROL
Filed March 13, 1939    4 Sheets-Sheet 2

Inventor
Stanley W. Nickells
George H Fisher
Attorney

April 21, 1942.  S. W. NICKELLS  2,280,345
PNEUMATIC CONTROL
Filed March 13, 1939  4 Sheets-Sheet 3

Inventor
Stanley W. Nickells
By George H Fisher
Attorney

Patented Apr. 21, 1942

2,280,345

UNITED STATES PATENT OFFICE 2,280,345

PNEUMATIC CONTROL

Stanley W. Nickells, Chicago, Ill., assignor to Minneapolis-Honeywell Regulator Company, Minneapolis, Minn., a corporation of Delaware Application March 13, 1939, Serial No. 261,672

14 Claims. (Cl. 121—41)

This invention relates in general to automatic controls and more particularly to automatic controls of the pneumatic or pressure actuated type.

It is an object of this invention to provide a pneumatic or pressure actuated control device of the non-leaking type which employs a pair of valves which control the flow of fluid to and from a valve chamber, these valves being controlled by a lever, the device being simple and rugged in construction, having a low reversal loss, and being adapted to form the basis of a plurality of types of controls.

A further object of this invention is to provide a device of the type mentioned in which the lever which actuates the valves has its axis of rotation located between the valves and in which the lever actuates the valves through a sealing diaphragm which forms one wall of a chamber common to both valves. A still further object is the provision of a device of this type in which a single diaphragm acts to actuate the lever and as the seal.

Another object of this invention is the provision of a controlling device for positively controlling the position of a pressure actuated motor.

Still another object of this invention is the provision of a device formed as mentioned above for variably controlling fluid pressure and which is adjustable manually or automatically, to thereby provide a non-leaking type controller.

A further object of this invention is the provision of a snap acting three-way or diverting valve utilizing the arrangement mentioned above.

Other objects will appear from the following description and the appended claims.

For a full disclosure of this invention, reference is made to the following detailed description and accompanying drawings, in which—

Figure 1:
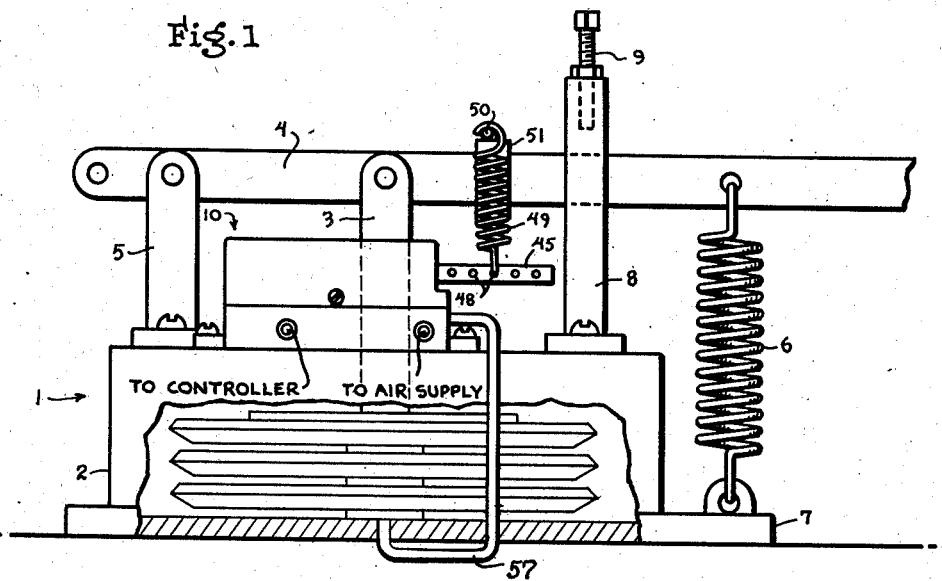
Figure 1 shows the application of the positive positioner to a damper motor.

Referring to Figure 1, reference character 1 indicates generally a pneumatic damper motor having a diaphragm casing 2 which contains the usual diaphragm as well known in the art. The diaphragm actuates a push rod 3 which is pivoted to an operating lever 4, this lever in turn being pivoted to a bracket 5 which is secured to the top of the diaphragm casing. A spring 6 is secured to the lever 4 and also to the base 7 of casing 2 and this spring serves to bias the lever arm 4 in a direction tending to collapse the diaphragm of the motor. The motor 1 is also shown as having a bracket 8 secured to the top of the casing 1 and carrying an adjustable stop screw 9 which serves to limit the movement of lever 4 in the upward direction. Damper motors of this type are well known in the art and form no part of this invention.

Figure 3:
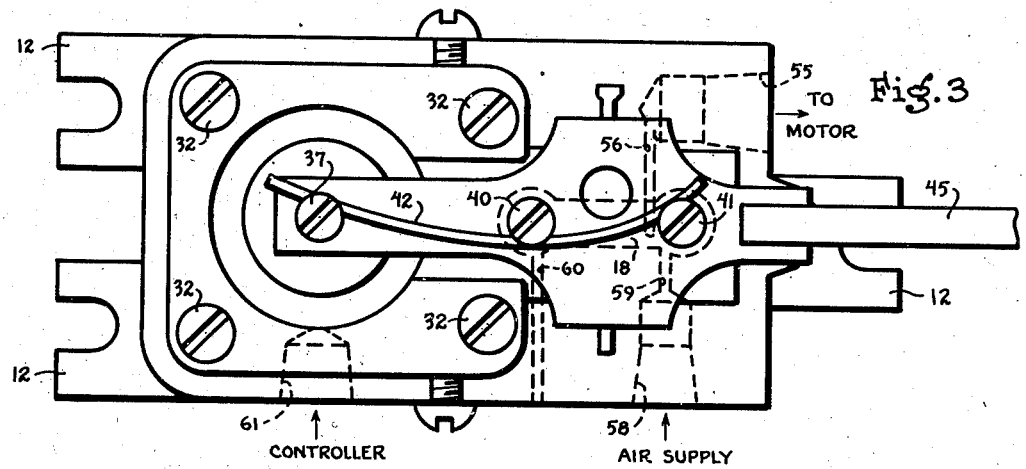
Figure 3 is a plan view of the positive positioner with the cover removed.
Figure 4:
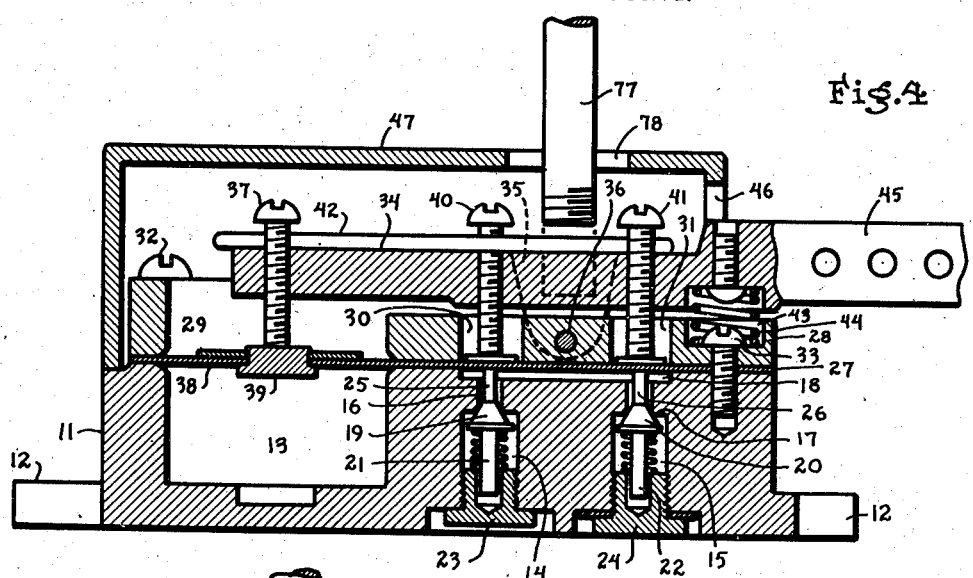
Figure 4 is a sectional elevation of the positive positioner.
Figure 5:
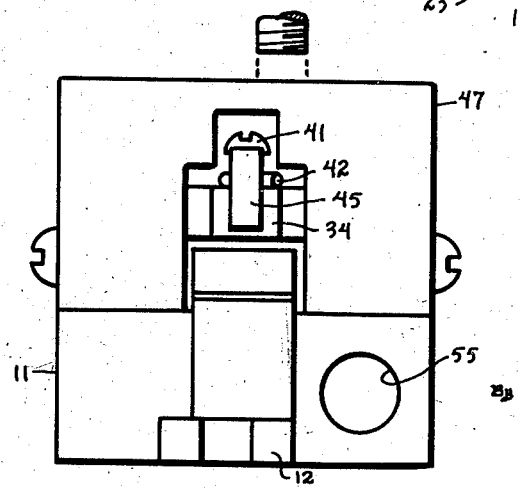
Figure 5 is an end view of the positive positioner.

In order to positively control the position assumed by the lever arm 4, I have provided the positive positioning device generally indicated at 10. This device is mounted directly upon the top of the diaphragm casing to one side of the push rod 3. Referring now to Figures 3, 4, and 5, this positive positioner consists of a base member 11 which is secured to the motor diaphragm casing by means of ears 12. This base member is formed to provide a diaphragm chamber 13 and also is provided with bores 14 and 15 which communicate with smaller bores 16 and 17 which form valve ports communicating with a valve chamber 18 which is also formed in the base member. Cooperating with valve ports 16 and 17 are valve members 19 and 20 having guide portions 21 and 22 which fit into suitable hollow plugs 23 and 24 which cover the lower ends of the bores 14 and 15. Provided between the valve members and the plugs are suitable springs for biasing the valve members against the valve ports. The valve members 19 and 20 are also provided with upwardly extending portions 25 and 26 which extend through the valve ports into engagement with a diaphragm 27. This diaphragm may be formed of any suitable material such as leather or rubber and preferably is made of a material known as Neoprene. It will be noted that this diaphragm 27 covers the entire base portion including the diaphragm chamber 13 and the valve chamber 18 and is held in place by means of a cover plate 28, this cover plate having an opening 29 which coincides with the diaphragm chamber 13 and openings 30 and 31 which are above the valves 19 and 20. This cover plate may be secured to the base portion 11 in any suitable manner such as by screws 32 and 33.

Reference character 34 indicates an operating lever having a depending portion 35 which is pivotally secured to the cover plate 28 at 36 which point it will be noted is mid way between the valve members 19 and 20. The lever 34 is provided with an adjustable screw 37 which extends through the opening 29 into engagement with the diaphragm portion 38 covering the diaphragm chamber. This diaphragm portion 38 may be provided with a metallic member 39 against which the screw 37 abuts. The lever 34 is also provided with adjustable screws 40 and 41 which extend through the openings 30 and 31 into engagement with diaphragm 27 directly above the valve extensions 25 and 26. The adjusting screws 40 and 41 are adjusted so that when the lever 34 is in intermediate position, both valves 19 and 20 engage their respective valve ports or seats. Upon clockwise rocking of the lever from this intermediate or neutral position, the valve member 20 will be disengaged from its seat while the valve member 19 will remain engaged with its seat. Upon rocking of the lever 34 in the counter-clockwise direction from this intermediate position, the valve port 17 will remain closed while the valve member 19 will be shifted from its seat. The adjusting screws 37, 40 and 41 may be held in their adjusted position in any suitable manner such as by lock nuts or by a spring such as 42 which is bent so as to engage each screw and frictionally hold each screw in its adjusted position.

The cover plate 28 is provided with a recess 43 which receives a spring 44 which is also received in a recessed portion of the valve lever 34. This spring serves to bias the valve lever in a counter-clockwise direction, thereby tending to hold the diaphragm portion 38 in downward position. The lever arm 34 is also provided with an extension 45 which extends through a suitable opening 46 in the cover 47.

Figure 1A:
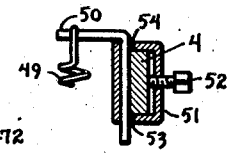
Figure 1a is a detail of the spring adjusting arrangement.

Referring now to Figure 1, the lever extension 45 is provided with a number of holes 48 which are adapted to receive a spring 49. The upper end of this spring is supported by a pin 50 which is carried by a collar 51 which surrounds the motor lever arm 4 and is secured in fixed position by means of a lock screw 52 (Figure 1a). The collar 51 is provided with openings 53 and 54 which receive the downwardly extending portion of pin 50. It will be apparent that by loosening lock screw 52, the collar 51 may be slid along the lever arm 4 and also the pin 50 may be moved upwardly or downwardly to thereby vary the tension of the spring 49.

Referring again to Figures 3, 4, and 5, the base portion 11 is provided with a bore 55 which is formed to receive a suitable pipe and this bore 55 communicates through a passage 56 with the valve chamber 18. This passage 55 is connected by a pipe 57 to the diaphragm of the damper motor (Figure 1). The valve chamber 18 is therefore in direct communication with the diaphragm of the motor. The base member 11 is also provided with a bore 58 which is adapted to receive an air supply pipe and which communicates with the valve bore 15 through a passage 59. Air under pressure is therefore supplied to the space beneath the valve member 20. The valve bore 14 communicates through a passage 60 with atmosphere. It will therefore be seen that the valve member 19 controls the exhaust of air from the valve chamber 18 and the motor diaphragm, while the valve member 20 controls the supply of air to the motor diaphragm.

The base member 11 is also provided with a bore 61 which is adapted to receive the control line from the controller which controls the motor position. For example, if the damper motor is controlled by a thermostat, the thermostat is connected to the positioner at this point. As shown, the bore 61 communicates with the diaphragm chamber 13 and thus the damper motor controller acts to vary the pressure applied to the diaphragm portion 38.

From the foregoing description, it will be apparent that the lever arm 34 is biased in the counter-clockwise direction by the spring 49 and is urged in the clockwise direction by the diaphragm portion 38. The diaphragm portion 38 thus opposes the action of the spring 49. When the tension of spring 49 just balances the pressure under diaphragm portion 38, the lever arm 34 will assume the intermediate or neutral position in which both the supply valve and the exhaust valve are closed and consequently the motor will remain stationary.

If the controller for the damper motor increases the pressure applied to diaphragm chamber 13, the upward force against diaphragm portion 38 will overcome the tension of spring 49 and thus rock lever arm 34 in the clockwise direction, thereby causing the screw 41 to urge the valve member 20 downwardly, thus permitting air under pressure to flow into the valve chamber 18 and through pipe 57 into the motor diaphragm which causes this diaphragm to expand and rotate the lever arm 4 in the counter-clockwise direction against the action of spring 6. As the lever arm 4 rotates in this direction, the tension of spring 49 will be increased, thereby tending to return the valve lever 34 to intermediate position. When the motor position just corresponds to the new pressure applied to diaphragm chamber 13 by the controller, the lever arm 34 will be returned to its initial position thereby causing the air supply valve to close for maintaining the motor stationary. Due to this positive supply of air to the motor until it reaches the correct position, the lever arm 4 will be caused to assume the exact position called for by the controller irrespective of the load upon the device controlled and friction.

If the motor controller reduces the pressure applied to the diaphragm chamber 13, the tension of the spring 49 will now overcome the upward force against diaphragm 38 and thus rock the valve lever 34 in a direction to open the vent valve 19. This will permit escape of air from the motor diaphragm and thus permit the spring 6 to cause rotation of the lever arm 4 in the clockwise direction. This movement of the lever arm 4 will reduce the tension of spring 49, thereby tending to return the lever arm 34 to the neutral or intermediate position. It will now be apparent that when the motor assumes the position required by the controller, the lever arm 34 will assume the neutral position for closing the vent valve 19.

It should be noted that due to the particular valve actuating arrangement utilized in which the valves are actuated through the sealing diaphragm and in which the valve lever arm is pivoted equidistant between the two valve members, frictional losses in the device are reduced to a minimum. Also, due to the pivoting of the valve lever equidistant between the valve members, the portion of the diaphragm covering the valve chamber 18 acts equally and oppositely upon the screws 40 and 41. This completely neutralizes the effect of changes in pressure within the valve chamber 18. This arrangement has proved very satisfactory in practice and it has been found that the device will operate to change the motor position on a change in applied pressure of only one-twentieth of a pound per square inch or less.

It should be noted that by adjusting the position of spring 49 on the extension 45 and the lever 4, the effect of the movement of lever arm 4 upon the tension of spring 49 and its effect upon the valve lever 34 may readily be varied. Thus if the spring 49 is shifted to the right on lever 4 and extension 45, the spring will be extended a greater amount for a given movement of lever arm 4 than occurs in the position shown. Consequently, there will be a greater change in spring tension for a given motor travel and thus for a given change in pressure applied to the diaphragm chamber 13, there will be a smaller amount of motor travel. This simple adjusting means permits the motor action to be easily varied to suit the particular sequence of operation desired for a given installation. By adjusting the position of pin 50, the initial spring tension may be varied. It will be apparent that this initial tension of spring 49 plus the force of spring 44 determines the minimum pressure which must be applied to the diaphragm chamber 13 in order to cause the lever arm 4 to begin travelling from its clockwise limit of rotation.

Figure 2:
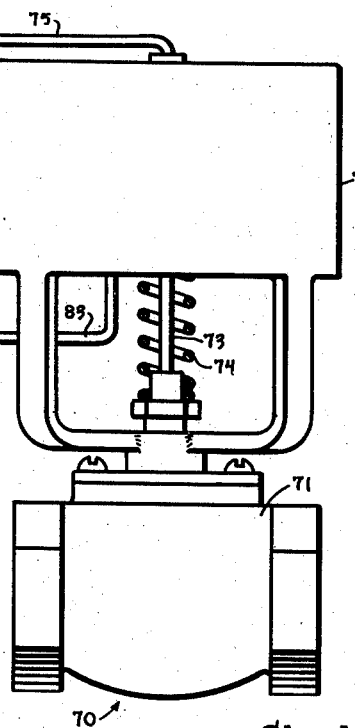
Figure 2 shows a pneumatic valve having the positive positioner applied thereto.

Referring to Figure 2, this figure shows the application of the same positive positioner to a pneumatically actuated valve. The valve 70 illustrated is of usual form including a valve casing, 71 upon which is mounted the usual diaphragm cage 72 containing the actuating diaphragm which operates the valve stem 73, the diaphragm being biased upwardly by a spring 74. In this case, the positioner 10 is mounted upon the side of the diaphragm cage and is connected to the diaphragm by means of pipe 75 which corresponds to the pipe 57 of Figure 1. When the positioner is applied to a valve, the lever arm extension 45 of the valve lever 34 is discarded and in its place an extension 77 is attached to the valve lever, this extension extending through an opening 78 in the cover member 47 (Figure 3). This extension 77 supports a collar 79, this collar being adjustably secured thereto by a lock screw 80 and supporting the positioner spring 81 corresponding to spring 49 of Figure 1. The lower end of spring 81 is attached to a link 82 which is in turn secured to a follow-up member 83 mounted in any suitable manner upon the motor diaphragm so as to move with the valve stem 73. The link 82 may be secured to the follow-up member 83 by means of nuts 84 which permit adjusting of the link axially of member 83 and also permit vertical adjustment of this link for varying the initial spring tension. It will be apparent that by adjusting the collar 80 and the link 82 axially of extension 77 and member 83, the valve movement for a given change in applied pressure may be readily adjusted, and that by adjusting the link 82 upwardly and downwardly the tension of spring 81 may be varied so as to determine the pressure at which movement of the valve begins.

From the foregoing description, it will be apparent that this invention provides a very simple, rugged and sensitive controller which is adaptable to different types of pneumatic motors and which can be readily adjusted to provide the desired sequence of operation for the motor to which it is applied. While the application of pressure to the diaphragm portion 38 is shown as being controlled by a pneumatic controller, the invention is not limited to this arrangement. If desired, the diaphragm chamber may be connected by a capillary tube to a control bulb at a desired location, and a volatile fluid provided for changing the pressure applied to the diaphragm with changes in temperature at the bulb.

Figure 6:
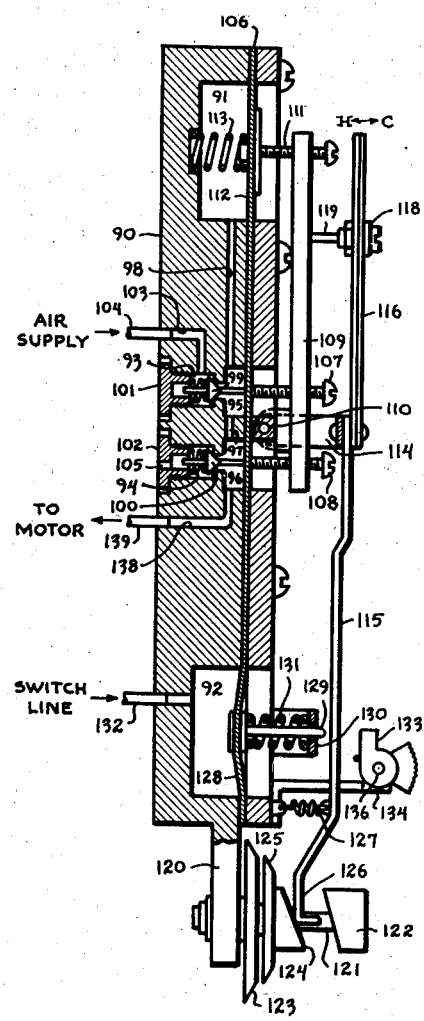
Figure 6 is a side view partly in section of the invention applied to a non-bleed type pneumatic thermostat.
Figure 7:
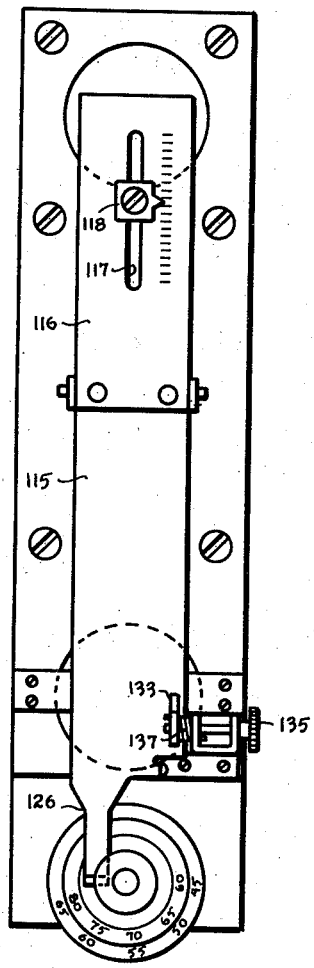
Figure 7 is an elevation of the thermostat shown in Figure 6.

Referring now to Figures 6 and 7, these figures illustrate the application of the improved diaphragm valve actuating assembly which is utilized in the positive positioner, to a thermostat of the non-bleed type. Reference character 90 indicates a base portion of the thermostat, this base portion being provided with a diaphragm chamber 91 and another diaphragm chamber 92. This base portion is also provided with bores 93 and 94 which communicate with valve chambers 95 and 96, respectively, through valve ports as shown. The chambers 95 and 96 communicate with each other through a passage 97 and communicate through a passage 98 with the diaphragm chamber 91. The bores 93 and 94 are provided with valve members 99 and 100, and these valve members are urged against their seats by means of springs and are provided with guides extending into plugs 101 and 102, this valve arrangement being the same as shown in Figure 4. The valve bore 93 communicates through a passage 103 with an air supply pipe 104. Therefore, the valve member 99 is an air supply valve. The valve bore 94 communicates with atmosphere through a port 105 in plug 102. Consequently, the valve member 100 is a vent valve. The supply and vent valves 99 and 100 are actuated through the diaphragm 106 which covers the diaphragm chambers 91 and 92 as well as the valve chambers 95 and 96, by means of adjustable screws 107 and 108 which are carried by a valve lever arm 109 which is pivoted at 110 intermediate the valve members. The arm 109 also carries an adjusting screw 111 which abuts the portion 112 of the diaphragm covering diaphragm chamber 91. The arrangement thus far described is substantially the same as shown in Figure 4. In this case, however, a spring 113 is located within the diaphragm chamber 91 for urging the diaphragm portion 112 outwardly thereby biasing the lever arm 109 in a direction tending to open the vent valve 100.

Also pivoted at 110 is a bracket 114 which carries an extension 115 to which is secured a bimetallic element 116. This bimetallic element is provided with a slot 117 for receiving an adjustable abutment member 118 having a pin 119 which engages the lever arm 109. For illustrative purposes, the bimetallic element 107 may be considered as warping to the left upon increase in temperature while warping to the right upon temperature decrease.

Attached to an extension 120 of the base portion 90 is a shaft 121 carrying a night adjusting cam 122. This shaft 121 is provided with an adjusting knob 123. Also mounted upon the shaft 121 is a day adjusting cam 124 which is rotated by an adjusting knob 125. The extension 115 which carries the thermostatic element 116 is provided with a portion 126 which extends into the space between the cams 122 and 124 and is urged against the cam 124 by means of a spring 127. It will be apparent that when the portion 126 engages the cam 124 the position of member 115 and thus the thermostatic element 116 can readily be adjusted by rotating the adjusting knob 125.

The portion 128 of diaphragm 106 which covers the diaphragm chamber 92 is secured to a pin 129 which extends through a guide member 130 and is adapted for engagement with the member 115. A spring 131 is provided between the guide member 130 and the diaphragm portion 128 for urging this diaphragm portion and the pin 129 out of engagement with the member 115 for thereby permitting the spring 127 to urge portion 126 into engagement with the daytime adjusting cam 124. However, when pressure is applied to the diaphragm chamber 92 through pipe 132 which may lead to a control panel, the force exerted against diaphragm portion 128 will overcome springs 131 and 127 for thereby forcing the portion 126 into engagement with the night adjusting cam 122. In doing so, it will be apparent that the position of thermostatic element 116 will be shifted to the left and it will also be apparent that the new position may be adjusted by rotating the night adjusting dial 123. If it is desired to prevent the thermostat from assuming the night position, a latch member 133 may be provided for holding the member 115 against the action of diaphragm portion 128 to retain the portion 126 in engagement with the day cam 124. This latch member 133 may be mounted upon a suitable bracket 134 and may be actuated by means of a knob 135 which rotates the shaft 136 upon which the latch member 133 is mounted. Also, a spring 137 may be provided for biasing the latch member towards the neutral position so that the thermostat will return to normal control when the pressure applied to the diaphragm chamber 92 is reduced.

In operation, assuming an increase in temperature within the space, the bimetallic element 116 will warp to the left thereby rocking the valve lever 109 against the action of spring 113 and the pressure in diaphragm chamber 91. This will open the air supply valve 99 and thus admit air under pressure into the diaphragm chamber 91 as well as the valve chambers 95 and 96, which pressure will be transmitted to the motor being controlled through passage 138 and pipe 139. As the pressure under diaphragm portion 112 increases, this diaphragm portion will be urged to the right thereby urging the valve lever 109 and bimetallic element 116 to the neutral or intermediate position. It will be apparent that when the pressure under diaphragm 112 balances the force of bimetallic element 116, the valve lever 109 will assume the intermediate position at which the air supply valve 99 and the vent valve 100 are both closed. It will also be apparent that upon a decrease in temperature, the bimetallic element 116 will move to the right, thus permitting the diaphragm portion 112 and spring 113 to rock valve lever 109 in a direction for opening the vent valve 100. This will decrease the pressure applied to the motor being controlled and also the pressure under diaphragm portion 112. This decrease in the force opposing bimetallic element 116 will cause the valve lever 109 to be returned to the neutral or intermediate position when the pressure under diaphragm portion 112 just balances the force of element 116. It will be apparent that by adjusting the position of abutment member 118 in the slot 117, the operating differential of the instrument may be readily varied as desired.

From the foregoing it will be apparent that this invention also provides a valve arrangement which is readily adaptable for forming a thermostat of the non-bleed type. While a bimetallic type of thermostat has been illustrated, a vapor pressure thermostat may be used in its place if so desired.

Figure 8:
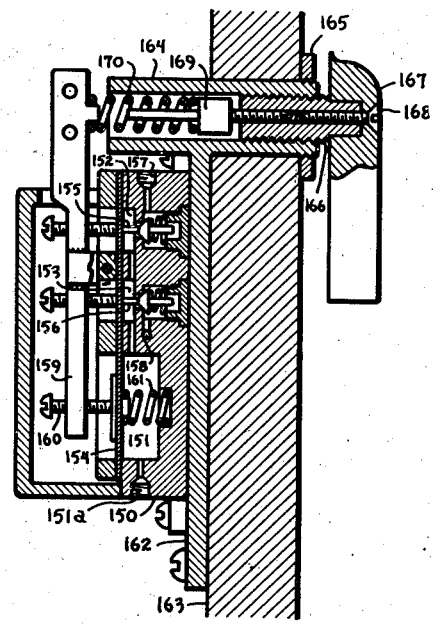
Figure 8 shows the invention applied to a manually actuated graduate switch.

Referring to Figure 8, this figure shows the application of this invention to a manually operated graduate switch. In this figure, reference character 150 indicates a base portion having a diaphragm chamber 151 and valve chambers 152 and 153 all of which are in communication as illustrated. The diaphragm chamber and the valve chambers are covered by a diaphragm 154 just as in the other embodiments of this invention. Also the valve chambers 152 and 153 are provided with valve members 155 and 156 which are arranged in exactly the same manner as the valves in the other embodiments. In this case, the valve 155 is a vent valve communicating with a vent passage 157 and the valve 156 is an air supply valve which communicates with a source of air under pressure through a passage 158. The valves are actuated through the diaphragm 154 by means of adjustable screws carried by the valve lever 159, this valve lever being actuated in part by the screw 160 which abuts the portion of diaphragm 154 covering the diaphragm chamber 151. The diaphragm chamber 151 also contains a spring 161 for biasing the diaphragm and lever arm in a direction tending to open the vent valve 155. This diaphragm chamber is connected to the motor being controlled through passage 151a.

The base member 150 is mounted upon a bracket member 162 which is suitably secured to a control panel 163. The bracket member 162 at its upper end is provided with a tubular portion 164 which extends through the panel board 163 and which is provided with a nut 165. The tubular portion 164 is internally threaded to receive an adjusting screw 166 to which is secured a handle 167 by means of a screw 168. The adjusting screw 166 through the screw 168 actuates a spring abutment member 169, a spring 170 extending between this member and the valve lever 159. It will be apparent that by rotating the handle 167, the compression of spring 170 may be varied.

The operation of this device is similar to the operation of the thermostat described in Figures 6 and 7. Thus the pressure exerted against the diaphragm 154 is balanced by the spring 170 and if this pressure overcomes the spring, the valve lever 159 will be rocked for opening the vent valve 155 for relieving pressure from the diaphragm chamber 151 and the device being controlled until the force upon diaphragm 154 just balances the spring 170, at which time both the supply and vent valves will be closed. Conversely, if the presure in diaphragm chamber 151 is not sufficient to balance the spring 170, the lever 159 will be rocked for opening the supply valve 156 for admitting additional air to the diaphragm chamber and the device being controlled until the necessary pressure is obtained. It is obvious that by adjusting the handle 167, the tension of spring 170 will be varied and consequently the pressure maintained by the instrument may readily be varied.

Figure 9:
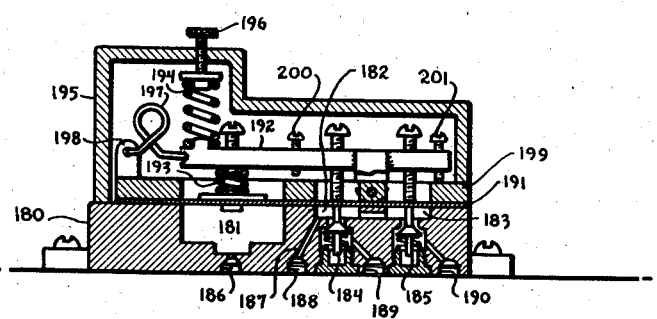
Figure 9 shows the application of the invention to a snap acting three-way or diverting valve.

Referring to Figure 9, this figure illustrates the application of the valve actuating arrangement to a snap acting three-way or diverting valve.

In this figure, reference character 180 indicates the base portion having a diaphragm chamber 181, a valve chamber 182, and a valve chamber 183, these valve chambers being provided with valves 184 and 185. The diaphragm chamber 181 is provided with a pipe connection 186. The valve chambers 182 and 183 are in communication with each other and communicate through a passage 187 with a pipe connection 188. The valve 184 controls air flow through a pipe connection 189, and the valve 185 controls air flow through a pipe connection 190.

As in the case of the other valves, the diaphragm chamber and the valve chambers are covered by a single diaphragm 191 and a lever arm 192 is provided for actuating the valves. In this case, a spring 193 is located between the diaphragm 191 and the lever arm 192. Also, an adjustable spring 194 is provided between the lever 192 and the cap member 195, this spring being adjustable by an adjusting screw 196 extending through the cap member. A snap action spring 197 is secured to a post 198 mounted upon the cover member 199, this spring fitting into a notch formed in the end of lever arm 192. This spring acts to prevent the lever arm 192 from assuming the intermediate position at which valve members 184 and 185 are both closed. The lever arm 192 is also provided with stop screws 200 and 201 for limiting the movement of this lever arm.

When the pressure applied to the diaphragm chamber 181 from the control instrument provides an upward force greater than the force exerted by spring 194, the lever arm 192 is rotated to the position shown in which the valve member 185 is disengaged from its valve seat, thereby placing the pipe connection 188 in communication with the pipe connection 190. As the pressure in diaphragm chamber 181 is reduced, the spring 194 will eventually overcome the upward force of the diaphragm and thus cause rocking of the valve lever 192 in the counter-clockwise direction. When this movement is sufficient to cause the valve member 185 to approach its seat, the spring 197 snaps the valve lever over to its other position in which the valve member 184 is disengaged from its seat to place the pipe connection 188 into communication with the pipe connection 189. While the spring 193 is not entirely necessary, this spring is desirable as it provides a resilient connection between the diaphragm and the valve lever, thereby allowing a slight amount of relative motion between the diaphragm and the valve lever for permitting the spring 197 to provide a more positive snap action.

While I have shown and described only a few possible embodiments of my invention, it will be understood that it may be applied to still other types of controls and that many changes in design can be made without departing from the scope of the invention. I therefore desire to be limited only by the scope of the appended claims.

I claim as my invention:

1. A positive positioning device for a pressure actuated motor comprising in combination, a pressure responsive device to which a controlling pressure is applied, a lever arm having a pivot, said lever arm being actuated about said pivot by said pressure responsive device, a pair of controlling valves for admitting and exhausting fluid to and from said pressure actuated motor, one of said valves being on one side of said pivot and the other of said valves being on the other side of said pivot, means for biasing said valves towards closed position, means actuated by said lever arm for actuating said valves, said last named means causing both of said valves to remain closed when said lever arm is in intermediate position while opening one of said valves upon movement of said lever arm in one direction and opening the other of said valves upon movement of said lever arm in the opposite direction, sealing means comprising a yieldable diaphragm interposed between said valves and said actuating means for forming a chamber common to both of said valves, said chamber being connected to said motor, and yieldable means connected between a movable portion of said motor and said lever arm for causing said lever arm to assume said intermediate position when the position of said movable portion corresponds to the pressure applied to said pressure responsive device.

2. A positive positioning device for a pressure actuated motor comprising in combination, a base portion associated in fixed relationship with the pressure actuated motor, said base portion including a diaphragm chamber and a valve chamber, a pair of valve ports in said valve chamber, a single diaphragm covering both said diaphragm chamber and said valve chamber, a pair of valve members associated with said valve ports so as to close the same upon movement of said valve members towards said diaphragm, means for biasing said valve members towards closed position, a lever arm pivoted in fixed relationship with said base portion and having its axis of rotation located between said valve ports, said lever arm actuating said valve members through said diaphragm in a manner to permit both of said valve members to close their respective ports when said lever arm is in intermediate position while moving one of said valve members towards open position upon rotation of said lever arm in one direction and moving said other valve member towards open position upon rotation of said lever arm in the opposite direction, said valve chamber being connected to said motor whereby said valve members control the flow of actuating medium to and from said motor, means actuated by the portion of the diaphragm covering said diaphragm chamber for actuating said lever arm, and yieldable means actuated by the motor for causing said lever arm to assume said intermediate position when the position of said motor corresponds to the pressure applied to said diaphragm chamber.

3. A positive positioning device for a pressure actuated motor comprising in combination, a base portion associated in fixed relationship with the pressure actuated motor, said base portion including a diaphragm chamber and a valve chamber, a pair of valve ports in said valve chamber, diaphragm means covering said diaphragm chamber and said valve chamber, a pair of valve members associated with said valve ports so as to close the same upon movement of said valve members towards said diaphragm means, means for biasing said valve members towards closed position, a lever arm pivoted in fixed relationship with said base portion and having its axis of rotation located between said valve ports, said lever arm actuating said valve members through said diaphragm means in a manner to permit both of said valve members to close their respective ports when said lever arm is in intermediate position while moving one of said valve members towards open position upon rotation of said lever arm in one direction and moving said other valve member towards open position upon rotation of said lever arm in the opposite direction, said valve chamber being connected to said motor whereby said valve members control the flow of actuating medium to and from said motor, means actuated by the diaphragm means covering said diaphragm chamber for actuating said lever arm, and yieldable means actuated by the motor for causing said lever arm to assume said intermediate position when the position of said motor corresponds to the pressure applied to said diaphragm chamber.

4. A fluid pressure controlling device of the character described, in combination, a base portion formed to provide a diaphragm chamber and a valve chamber, a pair of valve ports in said valve chamber, a single diaphragm covering both said diaphragm chamber and said valve chamber, a pair of valve members associated with said valve ports so as to close the same upon movement of said valve members towards said diaphragm, means for biasing said valve members towards closed position, a lever arm pivoted in fixed relationship with said base portion and having its axis of rotation located between said valve ports, said lever arm actuating said valve members through said diaphragm in a manner to permit both of said valve members to close their respective ports when the lever arm is in intermediate position while moving one of said valve members towards open position upon rotation of said lever arm in one direction from said intermediate position and moving the other of said valve members towards open position upon movement of said lever arm in the opposite direction from said intermediate position, means actuated by the portion of said diaphragm covering said diaphragm chamber for actuating said lever arm, and yieldable means for biasing said portion of said diaphragm in one direction.

5. A fluid pressure controlling device of the character described, in combination, a base portion formed to provide a diaphragm chamber and a valve chamber, a pair of valve ports in said valve chamber, diaphragm means covering said diaphragm chamber and said valve chamber, a pair of valve members associated with said valve ports so as to close the same upon movement of said valve members towards the diaphragm means covering said valve chamber, means for biasing said valve members toward closed position, a lever arm pivoted in fixed relationship with said base portion and having its axis of rotation located between said valve ports, said lever arm actuating said valve members through the diaphragm means covering said valve chamber in a manner to permit both of said valve members to close their respective ports when said lever arm is in intermediate position while moving one of said valve members toward open position upon rotation of said lever arm in one direction from said intermediate position and moving the other of said valve members toward open position upon movement of said lever arm in the opposite direction from said intermediate position, means actuated by the diaphragm means covering said diaphragm chamber for actuating said lever arm, and yieldable means for biasing said last mentioned diaphragm means in one direction.

6. A fluid pressure controlling device of the character described, in combination, a base portion formed to provide a diaphragm chamber and a valve chamber, a pair of valve ports in said valve chamber, diaphragm means covering said diaphragm chamber and said valve chamber, a pair of valve members associated with said valve ports so as to close the same upon movement of said valve members towards the diaphragm means covering said valve chamber, means for biasing said valve members toward closed position, a lever arm pivoted in fixed relationship with said base portion and having its axis of rotation located between said valve ports, said lever arm actuating said valve members through the diaphragm means covering said valve chamber in a manner to permit both of said valve members to close their respective ports when said lever arm is in intermediate position while moving one of said valve members toward open position upon rotation of said lever arm in one direction from said intermediate position and moving the other of said valve members toward open position upon movement of said lever arm in the opposite direction from said intermediate position, means actuated by the diaphragm means covering said diaphragm chamber for actuating said lever arm, said diaphragm chamber and said valve chamber being in communication so that the diaphragm means covering said diaphragm chamber controls the pressure in said diaphragm chamber, and biasing means for determining the value of pressure maintained in said diaphragm chamber.

7. A fluid pressure controlling device of the character described, in combination, a base portion formed to provide a diaphragm chamber and a valve chamber, a pair of valve ports in said valve chamber, diaphragm means covering said diaphragm chamber and said valve chamber, a pair of valve members associated with said valve ports so as to close the same upon movement of said valve members towards the diaphragm means covering said valve chamber, means for biasing said valve members toward closed position, a lever arm pivoted in fixed relationship with said base portion and having its axis of rotation located between said valve ports, said lever arm actuating said valve members through the diaphragm means covering said valve chamber in a manner to permit both of said valve members to close their respective ports when said lever arm is in intermediate position while moving one of said valve members toward open position upon rotation of said lever arm in one direction from said intermediate position and moving the other of said valve members toward open position upon movement of said lever arm in the opposite direction from said intermediate position, means actuated by the diaphragm means covering said diaphragm chamber for actuating said lever arm, said diaphragm chamber and said valve chamber being in communication so that the diaphragm means covering said diaphragm chamber controls the pressure in said diaphragm chamber, and biasing means for determining the value of pressure maintained in said diaphragm chamber, said biasing means comprising a condition responsive device which varies a biasing force in accordance with changes in value of the condition to which the condition responsive device responds.

8. A fluid pressure controlling device of the character described, in combination, a base portion formed to provide a diaphragm chamber and a valve chamber, a pair of valve ports in said valve chamber, diaphragm means covering said diaphragm chamber and said valve chamber, a pair of valve members associated with said valve ports so as to close the same upon movement of said valve members towards the diaphragm means covering said valve chamber, means for biasing said valve members toward closed position, a lever arm pivoted in fixed relationship with said base portion and having its axis of rotation located between said valve ports, said lever arm actuating said valve members through the diaphragm means covering said valve chamber in a manner to permit both of said valve members to close their respective ports when said lever arm is in intermediate position while moving one of said valve members toward open position upon rotation of said lever arm in one direction from said intermediate position and moving the other of said valve members toward open position upon movement of said lever arm in the opposite direction from said intermediate position, means actuated by the diaphragm means covering said diaphragm chamber for actuating said lever arm, said diaphragm chamber and said valve chamber being in communication so that the diaphragm means covering said diaphragm chamber controls the pressure in said diaphragm chamber, biasing means for determining the value of pressure maintained in said diaphragm chamber, said biasing means comprising a condition responsive device which varies a biasing force in accordance with changes in value of the condition to which the condition responsive device responds, means for pivotally mounting said condition responsive device, stop means for limiting movement of said condition responsive device about its pivot in each direction, and a pressure actuated device for shifting said condition responsive device between said stop means.

9. A fluid pressure controlling device of the character described, in combination, a base portion formed to provide a diaphragm chamber and a valve chamber, a pair of valve ports in said valve chamber, diaphragm means covering said diaphragm chamber and said valve chamber, a pair of valve members associated with said valve ports so as to close the same upon movement of said valve members toward the diaphragm means covering said valve chamber, means for biasing said valve members toward closed position, a lever arm pivoted in fixed relationship with said base portion and having its axis of rotation located between said valve ports, said lever arm actuating said valve members through the diaphragm means covering said valve chamber in a manner to permit both of said valve members to close their respective ports when said lever arm is in intermediate position while moving one of said valve members toward open position upon rotation of said lever arm in one direction from said intermediate position and moving the other of said valve members toward open position upon movement of said lever arm in the opposite direction from said intermediate position, means actuated by the diaphragm means covering said diaphragm chamber for actuating said lever arm, and snap acting means for preventing said lever means from remaining in said intermediate position.

10. A positive positioning device for a pressure actuated motor comprising, in combination, a base member adapted to be associated in fixed relationship with the pressure actuated motor, means providing a control chamber having a movable wall at one side of the base member, a valve chamber, said chambers being located side by side in said base member, said valve chamber being adapted for connection to the motor and extending through said one side of the base member, an inlet valve port for said valve chamber, an outlet valve port for said valve chamber, inlet and outlet valve members associated with respective valve ports, said valve members and valve ports being arranged so that the valve ports are between said valve members and said one side of the base member, the valve members having operating means extending through said valve ports into said valve chamber, means for biasing said valve members against their seats, a lever pivoted between said valve members and extending substantially parallel with said base member to a point opposite said movable wall, said lever being actuated by said movable wall and actuating said valve operating means, sealing means between said lever and said valve operating means for sealing off said valve chamber, and a follow-up spring adapted to be actuated by the pressure actuated motor for cooperating with said diaphragm in positioning said lever.

11. A positive positioning device for a pressure actuated motor comprising, in combination, a base member adapted to be associated in fixed relationship with the pressure actuated motor, said base member being recessed at one side to provide a control chamber and a valve chamber, said chambers being located side by side, said valve chamber being adapted for connection to the motor, an inlet valve port for said valve chamber, an outlet valve port for said valve chamber, inlet and outlet valve members associated with respective valve ports, said valve members and valve ports being arranged so that the valve ports are between the valve members and said one side of the base member, the valve members having operating means extending through said valve ports into said valve chamber, means for biasing the valve members against their seats, diaphragm means covering said control chamber and said valve chamber to provide a control diaphragm and a seal for said valve chamber, the valve chamber seal formed by the diaphragm means engaging the operating means for the valve members, a lever pivoted between said valve members and extending generally parallel to the base member to a point opposite the control diaphragm, said lever being actuated by said control diaphragm and actuating said valve operating means through said valve chamber seal, and a follow-up spring adapted to be actuated by the pressure actuated motor for cooperating with said control diaphragm in positioning said lever.

12. A pneumatic control device comprising in combination, a base member, said base member being recessed at one side to provide a control chamber and a valve chamber, said chambers being located side by side, an inlet valve port for said valve chamber, an outlet valve port for said valve chamber, inlet and outlet valve members associated with respective valve ports, said valve members and valve ports being arranged so that the valve ports are between the valve members and said one side of the base member, the valve members having operating means extending through said valve ports into said valve chamber, means for biasing the valve members against their seats, diaphragm means covering said control chamber and said valve chamber to provide a control diaphragm and a seal for said valve chamber, the valve chamber seal engaging the operating means for the valve members, and a lever pivoted between said valve members and extending generally parallel to the base member to a point opposite the control diaphragm, said lever being actuated by said control diaphragm and actuating said valve operating means through the valve chamber seal.

13. A pneumatic control device comprising in combination, a base member, said base member being recessed at one side to provide a control chamber and a valve chamber, said chambers being located side by side, an inlet valve port for said valve chamber, an outlet valve port for said valve chamber, inlet and outlet valve members associated with respective valve ports, said valve members and valve ports being arranged so that the valve ports are between the valve members and said one side of the base member, the valve members having operating means extending through said valve ports into said valve chamber, means for biasing the valve members against their seats, diaphragm means covering said control chamber and said valve chamber to provide a control diaphragm and a seal for said valve chamber, the valve chamber seal engaging the operating means for the valve members, a plate member for securing said diaphragm means in place, said plate member having an opening coinciding with said control chamber and an opening adjacent said valve chamber, a lever pivoted to said plate member at a point between said valve members and having means actuating the valve operating means through the valve chamber seal, said lever extending generally parallel to said plate member to a point opposite the control diaphragm and being actuated thereby.

14. In a three-way valve device, in combination, a base having a recess therein and a substantially flat surface surrounding said recess, a normally flat diaphragm carried against the flat portion of said base and extending over the recess for forming a pressure tight chamber between said base and said diaphragm, first and second valve members biased toward said diaphragm to engage a pair of valve seats in said base, said valve members having portions extending into the recess for engagement by said diaphragm, an operating lever having a pivot between said valve members, said lever and pivot being located outside the chamber formed by said diaphragm and said base, and valve actuating means carried by said lever, said actuating means comprising a pair of abutments extending to points directly across said diaphragm from the portions of said valve members which extend into the recess in said base, at least one of said abutments being adjustable with respect to said lever for adjusting the movement of said lever necessary to move said first valve member from its seat after said second valve member has engaged its seat.

STANLEY W. NICKELLS.